S. D. LOCKE.
Variable Speed Gearing.
No. 213,338.    Patented Mar. 18, 1879.
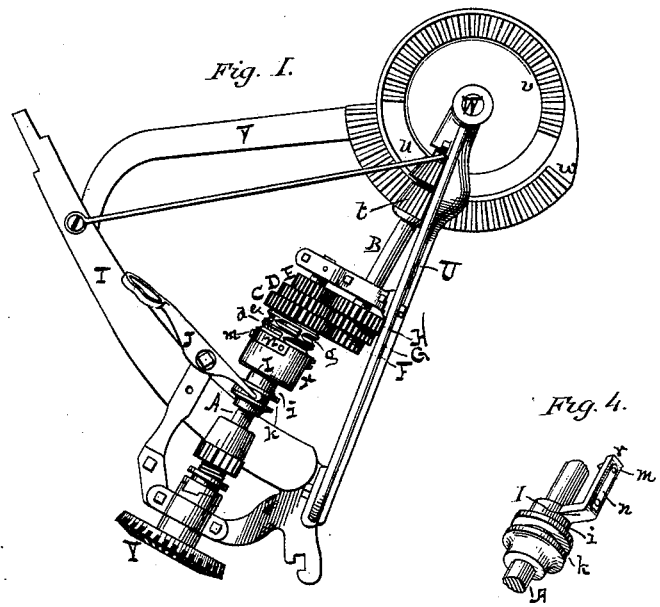
Fig. 1.
Fig. 4.
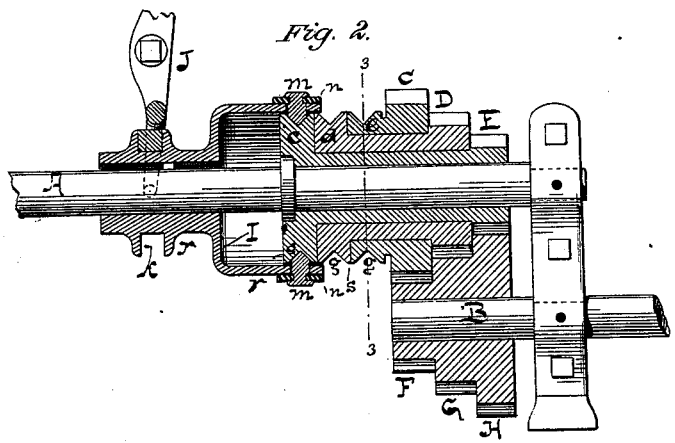
Fig. 2.
Fig. 3.
Attest:
Clarence Poole
Aug. J. Jordan
Inventor:
Sylvanus D. Locke

UNITED STATES PATENT OFFICE.

SYLVANUS D. LOCKE, OF HOOSICK FALLS, NEW YORK.

IMPROVEMENT IN VARIABLE-SPEED GEARING.

Specification forming part of Letters Patent No. 213,338, dated March 18, 1879; application filed December 19, 1878.

*To all whom it may concern:*

Be it known that I, SYLVANUS D. LOCKE, of Hoosick Falls, Rensselaer county, New York, have invented new and useful Improvements in Variable-Speed Gearing, of which the following is a specification:

This invention relates to an improvement in variable-speed devices, for which Letters Patent No. 204,585, dated June 4, 1878, were granted to me; and it consists, essentially, of a series of change-gears, substantially as set forth in my said patent, and a corresponding series of clutches arranged in connection with a hand-lever or other suitable device mounted upon stationary supports, so that the attendant can, without stopping the machinery, shift said clutches, and thereby vary the speed of the driven member at will.

This improvement is applicable to machinery of any class where it is desirable to provide for variable speeds of the driven member; and I therefore do not propose in this patent to limit myself in its application to any certain line of machinery, though in the drawings I represent some of the parts of an automatic grain-binder, to which I propose to make more immediate application of this improvement. Neither do I propose to limit myself to the precise structure of the parts shown, because it is evident such structure may be varied to adapt the improvement to particular machines.

That others may fully understand my device and the particular mode of putting the same into use, I will particularly describe it, having reference to the accompanying drawings, wherein—

Figure 1 is a perspective view of my device with parts of an automatic binder, for the purpose of illustrating one way of applying said device. Fig. 2 is a longitudinal section of the same. Fig. 3 is a transverse section of one of the clutch-hubs. Fig. 4 represents a modification of clutch mechanism.

A B are two shafts, which are mounted in bearings, (shown in drawings,) axially parallel. Either of these shafts may be the driver and the other the driven; but for convenience I will designate A as the driver and B as the driven. Upon one or the other of these shafts (say, upon A) a series of loose gears, C D E, is mounted, and prevented from sliding endwise out of place by stops of some suitable kind. Upon the opposite shaft (say, B) a series of similar gears, F G H, is mounted, and these are all fixed to the shaft. The gears C F, D G, and E H are, respectively, in mesh with each other, and are what is denominated "spur-gears;" but when, for any reason, the shafts A B are not parallel, it is evident that these gears may be beveled to conform to the inclination of the shaft.

It is evident that if either one of the first series C D E is locked fast to the shaft A, that will be transmitted through that member to or from the opposite shaft, and that if neither of them be so locked, then motion will not be transmitted.

It is also evident that instead of the toothed gearing shown in drawings frictional gearing may be used, and, in some machines, belts might, with advantage, be used instead of the teeth.

In the patent above named these effects are set forth, and the object of the improvement herein described is to enable the attendant to lock or unlock either of said wheels C D E, or, in other words, to change the speed of the driven mechanism or to stop its motion at will without stopping the driving machine or mechanism while making the change. To accomplish this readily I provide each of said gear-wheels C D E with a disk or hub, $c\ d\ e$, their peripheral faces all at the same distance, or nearly so, from the axis of shaft A, and in the peripheral face of each of said hubs $c\ d\ e$, I make one or more cells or cavities, $g$, the lateral sides whereof are inclined.

A clutch-hub, I, has a sleeve or arm fitted to slide freely over these hubs, and said sleeve or arm is long enough to inclose or reach them all. In the drawings this part is shown as a sleeve; but if its unused portions be cut away it in effect becomes an arm, as shown in Fig. 4. The sleeve or arm $r$ is mounted upon the hub part $i$, which is fitted to slide upon the shaft A, but is prevented from turning thereon by a spline and feather or other convenient device for the purpose.

A groove, $k$, in the hub $i$ enables the clutch-hub to be moved and controlled by an ordinary clutch-lever, J, which is pivoted to any proper support.

The sleeve r is provided with one or more clutch-pins, m, fitted to enter and engage with the cavities g, so as to lock said sleeve to the hub so engaged and cause its corresponding gear-wheel to revolve with its shaft. These pins I prefer to mount, as shown, on the ends of flat strap-springs n, though it is evident they may be otherwise mounted in a variety of ways. The ends of the pins m are beveled laterally, so that when the sleeve I is moved they will ride up the inclined sides of the cells g and pass over into the corresponding cells of the adjacent hub, and thereby enable the attendant to shift the clutch at will, and without stopping the prime mover.

I prefer to make these cells of such shape as to cause each hub to become a ratchet-faced clutch, with which the clutch-pin (properly beveled) engages while the machine is in forward motion, and does not engage while in backward motion.

When the machine is in motion and the driven mechanism is propelled by either of the wheels C D E, a simple movement of the lever J, so as to take the clutch-pin from engagement with that wheel to engagement with either of the others of the series, effects an instantaneous change of the speed of the driven mechanism. If the movement of the lever J necessary to carry the clutch-pin from g on the hub of C to g on the hub of D, and from g on the hub of D to g on the hub of E, be denominated respectively each one step, then the movement of the lever necessary to carry the clutch-pin from one clutch-hub to a point, S, midway between it and an adjacent hub may be called a half-step; but when the clutch-pin is at S it is in engagement with neither of the wheels. If, therefore, it is desired to stop the driven without stopping the driving mechanism, it is only necessary to move the lever J a half-step, or so as to bring the clutch-pin on one of the rests S S.

In Fig. 1 this mechanism is represented as applied to an automatic grain-binder, of which T is a part of the receptacle-frame. U is a part of the main standard. V is the binding-arm, rotated by the shaft W at variable speed by means of the pinions t u and segments v w. Motion is received from the prime mover by the wheel Y.

Having thus described my invention, what I claim, and desire to secure by Letters Patent, is—

1. The series of loose wheels C D E, having hubs c d e, mounted, one on another, on a common shaft, and provided as to their peripheries with independent clutch-faces.

2. The series of loose wheels C D E, mounted upon a common shaft, each having a hub presenting on its periphery an independent clutch-face, and together provided with the half-steps or resting-places S S, as set forth.

3. The several loose hubs c d e, mounted upon the shaft A, each provided with cells g, combined with a sliding clutch-hub, I, provided with one or more clutch-pins, m, and a shifting-lever, J, pivoted upon some stationary support.

4. The clutch-hub I, mounted so as to turn with and slide on the shaft, and extended longitudinally so as to cover the peripheral clutch-faces of the several wheels, as set forth, combined with a clutch-pin actuated by a spring to keep it in place.

5. The clutch-hub I, mounted so as to turn with and slide on the shaft, and provided with a sleeve or arm carrying a self-acting clutch mechanism pivoted thereto, combined with an actuating shifting-lever pivoted to an independent support and one or more peripheral clutch-faces on as many separate wheels, as and for the purpose set forth.

6. The several wheels C D E, loosely mounted upon a common shaft, and provided with hubs having peripheral clutch-faces, equidistant, or nearly so, from said shaft, combined with clutch mechanism sliding on said shaft, the combination operating so that by sliding the clutch mechanism either one of said wheels, at will, may be locked to the shaft.

7. A series of loose wheels, as set forth, each provided with a clutch-hub, combined with a clutching device, mounted and longitudinally movable upon the same shaft, but compelled to rotate therewith, and provided with locking mechanism capable of riding from one of said hubs to another, as set forth, combined with a shifting-lever.

8. A series of loose wheels having hubs with peripheral clutch-faces and a sliding clutch mechanism mounted upon the same shaft and external thereto, combined with a shifting-lever having an independent support, the combination operating so that an attendant, by the movement of the lever, can at will stop the driven mechanism or change its speed without stopping or interfering with the driving mechanism.

9. The loose gear-wheels C D E, provided with cylindrical disks or hubs, all of equal diameter, and provided with peripheral cells g, combined with the sleeve I upon the shaft A, and capable of longitudinal motion only thereon, and provided with elastic clutch-pins m, as and for the purpose set forth.

S. D. LOCKE.

Witnesses:
WM. M. ARCHIBALD,
CHARLES A. BROWN.